Figure 1:
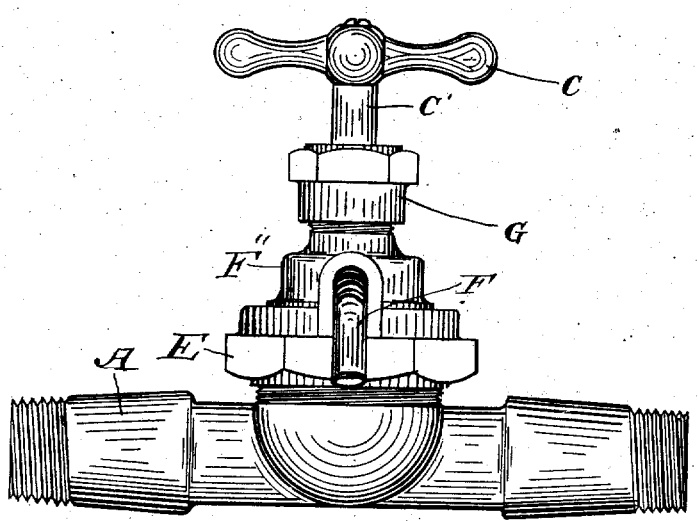

No. 853,246.  
PATENTED MAY 14, 1907.

J. F. LAMPING.  
STOP COCK.  
APPLICATION FILED SEPT. 11, 1905.

Witnesses  
C. M. Fahnestock  
Joseph R. Rohrer

Inventor  
John F. Lamping  
By Stein Heidman Mellitz  
Attorneys

UNITED STATES PATENT OFFICE.

JOHN F. LAMPING, OF CINCINNATI, OHIO.

STOP-COCK.

No. 853,246.         Specification of Letters Patent.         Patented May 14, 1907.

Application filed September 11, 1905. Serial No. 277,926.

*To all whom it may concern:*

Be it known that I, JOHN F. LAMPING, a citizen of the United States, and a resident of Cincinnati, in the county of Hamilton and State of Ohio, have invented a certain new and useful Improvement in Stop-Cocks, of which the following is a description.

My invention relates to stop-cocks for use in shutting off a flow or supply of water, and at the same time permit the back-water or water above the stop-cock in the pipes to be discharged, so that the pipes above the stop-cock may be entirely emptied; and the object of my invention is to provide a stop-cock, of what is known as the compression type, in which the water supply may be quickly closed off; the construction being such as to permit of quick repair.

The purpose is to provide a construction which will stand a considerable amount of wear without needing repair, comprising very few parts to become worn, and which will be simple in construction, and one which may also be thrown rapidly to or from its seat; and in which the washers employed will not be subjected to a twisting strain.

The invention consists in providing the usual shell, which has an inlet and discharge end connected by a port through a wall or diaphragm, the port being so arranged as to permit the valve above to readily seat itself on the port when it is desired to shut off the flow of water from the inlet end, and also providing the shell with a chamber immediately above the port in the diaphragm, this chamber being provided with a cylinder adapted to move upward and downward therein, said cylinder being operatively connected with the stem of the handle; the connection being such as to permit the cylinder to be readily slid from its connection with the handle-stem when it is desired, the cylinder being provided with a groove or cut-away portion on its upper surface which is normally intended to be above the washer or gasket set in the chamber and surrounding the cylinder, so that water may not enter into the slot or cut-away portion until it is desired to shut off the water and permit the water in the pipes above the stop-cock to flow off, when the cylinder is moved to the opposite end of its chamber, permitting its lower end to be seated on the port in the diaphragm of the shell, shutting off the flow of water through the port in the diaphragm, and at the same time bringing the slot or cut-away portion slightly below the washer or gasket in the chamber, so that the water above the inlet port may pass through said slot or cut-away portion in the cylinder and into a small chamber provided with an outlet opening or pipe, as will more fully be hereinafter set forth.

Figure 3:
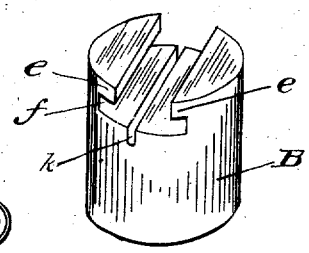
Figure 2:
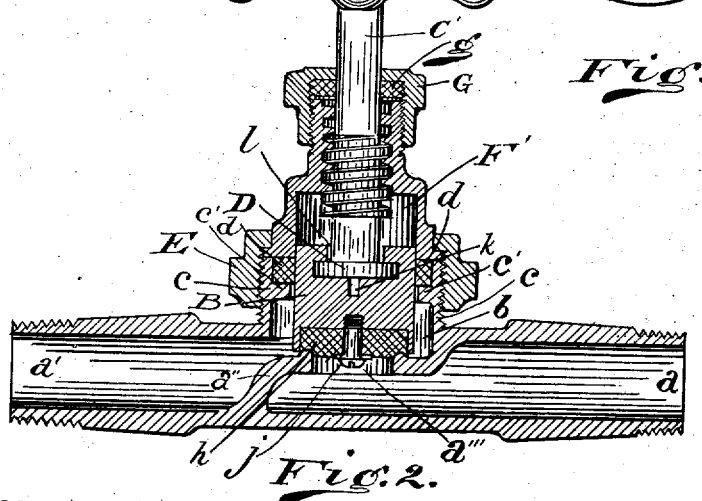

In the drawing:—Figure 1 is a side elevation of a stop-cock embodying my improvement; Fig. 2 is a horizontal sectional view of Fig. 1 with the handle and its stem shown in full; Fig. 3 is a perspective view of the cylinder forming the valve.

Like letters of reference indicate identical parts in the respective figures.

A is a shell or pipe of a well-known construction, in which $a$ is the inlet or admission end for the water, and $a'$ the outlet or discharge end thereof, the two ends being separated by a diaphragm $a''$, which diaphragm is provided with a port $a'''$ through which the water flows when the cock is open. Immediately above the diaphragm $a''$ and its port $a'''$ is a chamber $b$ with which the discharge end $a'$ of the case or shell A communicates. This chamber $b$ is formed by the walls $c$ extending out from the shell and made integral with the shell or case A. This wall $c$ is also preferably provided slightly below its top, with an annular flange or shoulder $c'$ on which the washer or gasket $d$ is intended to take. This washer or gasket $d$ is sufficiently large to fit closely about the cylinder or block B, which cylinder is preferably provided on its upper surface with the cut-away portions to provide the shoulders $e$, which extend slightly into the cut-away portions, and thus providing a slot which is somewhat in the shape of an inverted T, as at $f$.

C is the usual handle, whose stem C' is provided with the worm or threads intermediate of its ends, while its lower end terminates in the disk portion D which takes into the slot $f$ of the cylinder B, see Fig. 2.

Secured on top of the shell or case A, by the collar E, and which is provided with threads adapted to take onto the threaded right-angular extension $c$ on the case A, is the tubular sleeve F'' which is provided with threads into which the stem C' of the handle takes. The tubular sleeve is so constructed as to provide a chamber F' in its lower portion to permit the cylinder B to move upward therein. This tubular sleeve is also preferably provided with threads on its upper outside end to receive the ring G which compresses a washer $g$ on top of the tubular sleeve F'' and closely surrounds the stem C' of the handle C so as to prevent the possibility of any leakage at this point.

The bottom of the cylinder B is preferably hollowed out so as to receive a washer $h$ which may be secured in place by the screw $j$ which takes into the cylinder B. By having the washer $h$ on the bottom of the body B a water-tight joint may be had at the port $a'''$ in the diaphragm $a''$ when the cock has been turned off.

The cylinder B is also provided with a transverse groove or cut $k$ (see Figs. 2 and 3), which is preferably provided at the point indicated in Figs. 2 and 3, and which cut or groove $k$ is formed so as to be normally underneath the washer or gasket $d$, that is when water is turned on, so that no water may enter into the cut or groove $k$, and pass into the chamber F' above the cylinder B, which would be possible by reason of the fact that the stem C' is made slightly smaller in diameter than the upper portion of the inverted T-shape groove in the cylinder B, as can be seen at $l$ (see Fig. 2). When it is desired to shut off the flow of water from the inlet $a$ of the shell or case A through the port $a'''$, the handle C is turned in the proper direction, screwing the stem C' downward, and thus bringing the cylinder B, with its washer on its bottom, onto the diaphragm $a''$ and closing the port $a'''$. By thus screwing the stem C' and the cylinder B onto the diaphragm, the cut-away portion or groove $k$ will be either entirely, or partially, brought beneath the washer or gasket $d$, and into the chamber $b$. It will thus be seen that any water in the end $a'$ will enter into the chamber $b$ and pass through the groove or cutaway portion $k$ into the space $l$ intermediate of the stem C' and the shoulders $e$, into the chamber F' from which it will be discharged by the outlet pipe F (see Fig. 1) which takes through the tubular sleeve F''.

It will be noticed that while the stem C' of the handle C is turned, its connection with the cylinder B will permit the block B to move without being revolved, thus pressing the block or cylinder with its washer $h$ onto its seat in a direct manner, without subjecting it to a twisting motion and produce a grinding, frictional contact between the seat and the washer, which would result in quickly wearing away the washer and necessitate frequent repair, especially when the stop-cock is put into frequent use.

It will be seen that my improved construction will not readily become out of order, and that the valve or its washer or gasket is subject to as little friction or wear as is possible, thereby greatly prolonging the life of the valve. Furthermore, it will be noticed that with my improved construction, there are no washers or gaskets to be twisted or turned in the operation of the handle, which is very objectionable with stop-cocks of this kind, for the reason that ordinarily these stop-cocks are not employed for considerable lengths of time, during which period the washers or gaskets, which are generally composed of a rubber composition, are liable to adhere more or less to the metallic parts with which they are in contact, and then, when it is desired to turn the cock, these washers or gaskets are inclined to twist with the valve and thereby become torn, thus affecting the water-joint at that point, permitting the cock to leak. With my improved valve it will be seen that the washer or gasket $d$ is not subject to a twisting strain, as the cylinder B rides or slides from end to end in the chamber and does not twist.

Should it be desired to repair the stop-cock, it will be seen that it is simply necessary to unscrew the ring E from the extensions $c$ of the shell or case, which will permit the entire valve to be taken out, giving ready access thereto. With the ring E screwed off sufficiently, and stem C' screwed down to its fullest extent in the tubular sleeve F'', the cylinder B can be slid off of the disk D on the bottom of the stem C'.

I have shown and described what I believe to be the preferable construction of my improved stop-cock, but it will be readily understood that the same may be altered in slight minor details, the object of the invention being to provide a passage-way in or through the cylinder at such point, that water may pass from the outlet end of the shell to the upper end of the chamber when the cylinder has been forced to its seat, and such passage may assume a different form from that illustrated and described, without departing from the spirit of my invention.

I have described my stop-cock heretofore as being adapted for use as a stop and waste-cock, for which purpose the cylinder B is provided with a passage such as the slot $k$, whereby communication between the upper and lower ends of the chamber may be established when the cylinder is seated on the port; the upper end of the chamber in such case being provided with the usual outlet tube or pipe. It is apparent however, that when it is intended merely to use the invention as a stop-cock, and not as a stop and waste cock, that in such case the cylinder B need not be provided with a slot or passage-way such as $k$ to establish communication between the two ends of the chamber; the cylinder B being constructed without the slot $k$ shown in Figs. 2 and 3.

I do not wish to be understood therefore, as limiting myself to the exact construction shown and described, but What I wish to secure by Letters Patent, is:—

1. A stop cock comprising a shell, whose ends are separated from each other by a diaphragm provided with a port whereby communication between both ends of the shell is established, a chamber in said shell, immediately above said diaphragm, and having communication with the outlet end of said shell, a washer seated within said chamber, means within said chamber for retaining said washer against displacement, a cylinder in said chamber adapted to slide through said washer from one end of the chamber to the other to be seated on the port in the diaphragm and provided with a washer on its under surface, said cylinder being provided with a passage-way leading from a point beneath the top to a point at or near its top whereby communication between both ends of the chamber may be established when the cylinder is forced to its seat on the port, and means having a loose connection with said cylinder whereby the latter is moved to the desired position with a movement different from the movement of said means.

2. A stop-cock comprising a shell having its inlet end separated from the outlet end by a diaphragm, said diaphragm being provided with a port to establish communication between the ends of the shell, a chamber above said port and connected with the outlet end of the shell, a cylinder in said chamber adapted to be seated on the port in the diaphragm, a washer seated within said chamber and taking about the cylinder, said cylinder being provided with a groove at a point normally beneath said washer, said groove communicating with the portion of the chamber immediately above said cylinder and so that when the cylinder is seated on the port in the diaphragm, communication is established between the upper and lower ends of said chamber, and means whereby said cylinder is operated.

3. A stop-cock comprising a shell having its inlet and outlet ends separated by a diaphragm, said diaphragm being provided with a port whereby communication between the two ends is established, a chamber immediately above said port in the diaphragm, a cylinder within said chamber, a washer seated within said chamber and taking about said cylinder, said cylinder provided with a passage-way normally closed by said washer, means having operative connection with said cylinder whereby the latter may be forced to its seat and a portion of the passage-way brought beneath the washer thereby establishing communication between the upper and lower ends of said chamber.

4. A stop-cock comprising a shell having its inlet and outlet ends separated by a diaphragm, said diaphragm provided with a port to establish communication between both ends of the shell, a chamber above said port provided with an annular shoulder, a washer adapted to be seated on the shoulder in said chamber, a cylinder adapted to slide back and forth in said chamber and taking through said washer, said cylinder provided with a port communicating with an inverted T-shaped groove in the upper face of said cylinder, whereby communication between the upper and lower ends of the chamber may be established when the cylinder is forced to its seat on the port in the diaphragm means controllably mounted on said chamber and taking into the groove in said cylinder whereby a loose operative connection between said means and the cylinder is established.

JOHN F. LAMPING.

Witnesses:
JOSEPH R. ROHRER,
GEORGE HEIDMAN.